United States Patent

[11] 3,618,824

[72] Inventor Shaun A. Seymour
 Ephrata, Pa.
[21] Appl. No. 756,478
[22] Filed Aug. 30, 1968
[45] Patented Nov. 9, 1971
[73] Assignee Sperry Rand Corporation
 New York, N.Y.

[54] MATERIAL SPREADER
 7 Claims, 9 Drawing Figs.
[52] U.S. Cl. .................................................. 222/51,
 222/178, 239/666, 239/683
[51] Int. Cl. ....................................................... A01c 3/06
[50] Field of Search ......................................... 222/236,
 51, 178, 228, 233, 234, 235; 239/665, 681, 683,
 687, 666

[56] References Cited
 UNITED STATES PATENTS
1,508,210 9/1924 Bangert .................... 239/666 X
2,549,851 4/1951 Pope ........................ 222/235 X

| | | | |
|---|---|---|---|
| 3,138,300 | 6/1964 | Rintala .................... | 222/228 |
| 3,218,083 | 11/1965 | Van Der Lely ........... | 239/687 X |
| 3,232,627 | 1/1966 | Larson ..................... | 239/666 |
| 361,474 | 4/1887 | Weygant .................. | 222/57 |
| 1,312,226 | 8/1919 | Bangert ................... | 239/665 X |
| 3,164,387 | 1/1965 | Van Der Lely ........... | 239/681 X |
| 3,189,355 | 6/1965 | Swenson et al. ......... | 239/665 X |
| 3,241,841 | 3/1966 | Kucera .................... | 239/681 X |
| 3,392,922 | 7/1968 | Lindgren ................. | 239/683 X |

Primary Examiner—Robert B. Reeves
Assistant Examiner—Frederick R. Handren
Attorneys—Joseph A. Brown, John C. Thompson and James J. Kennedy ABSTRACT: A material spreader comprised of a tank, mounted on a wheeled frame and adapted to contain liquid manure, an inlet port to fill the tank, and outlet to discharge slurry material from the tank, agitator means within the tank to keep solids in suspension, and adjustably positionable distributing means adjacent the outlet adaptable to distribute the slurry on the ground in a uniform pattern of preselected direction.

PATENTED NOV 9 1971

INVENTOR.
SHAUN A. SEYMOUR
BY James J. Kennedy
ATTORNEY

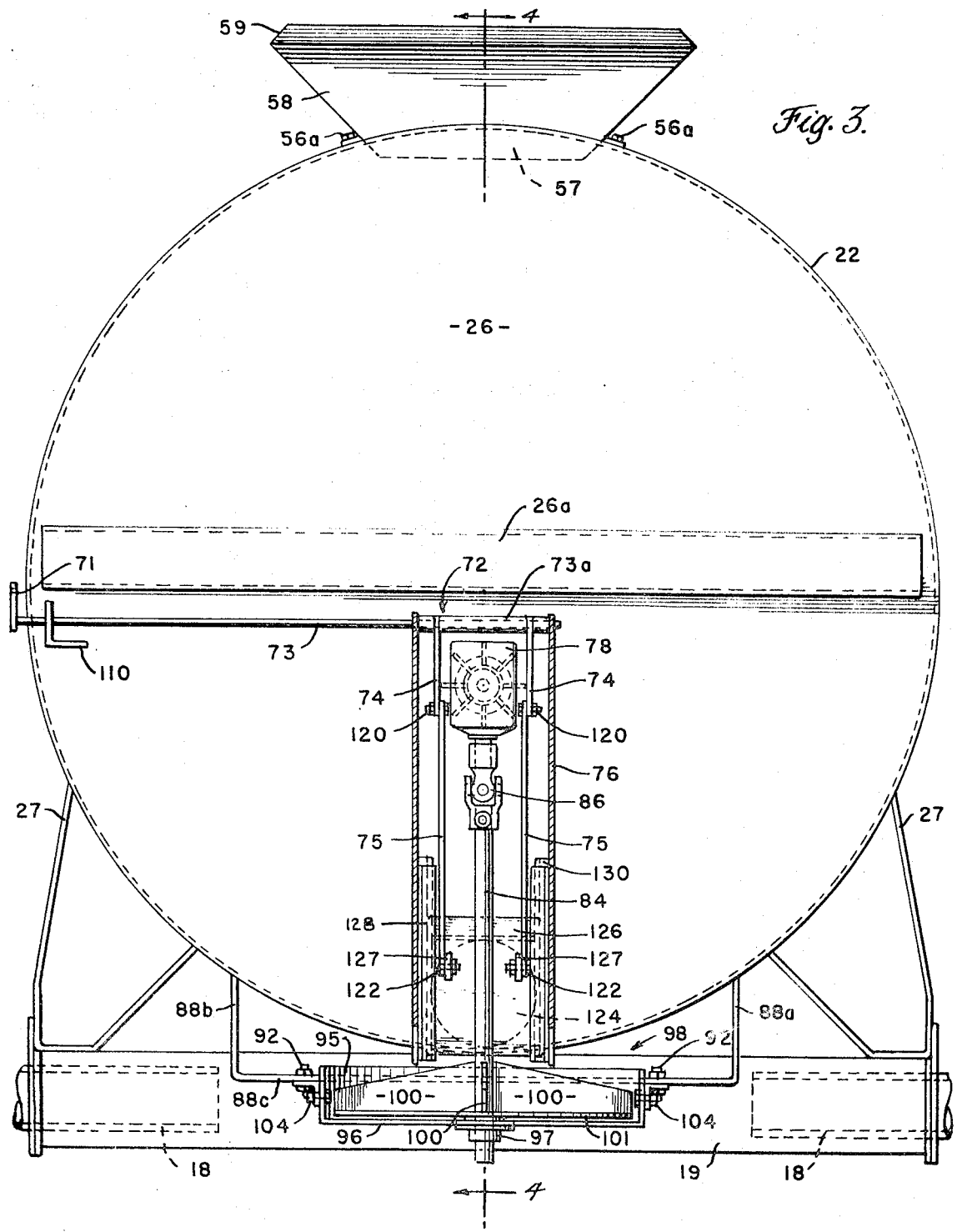

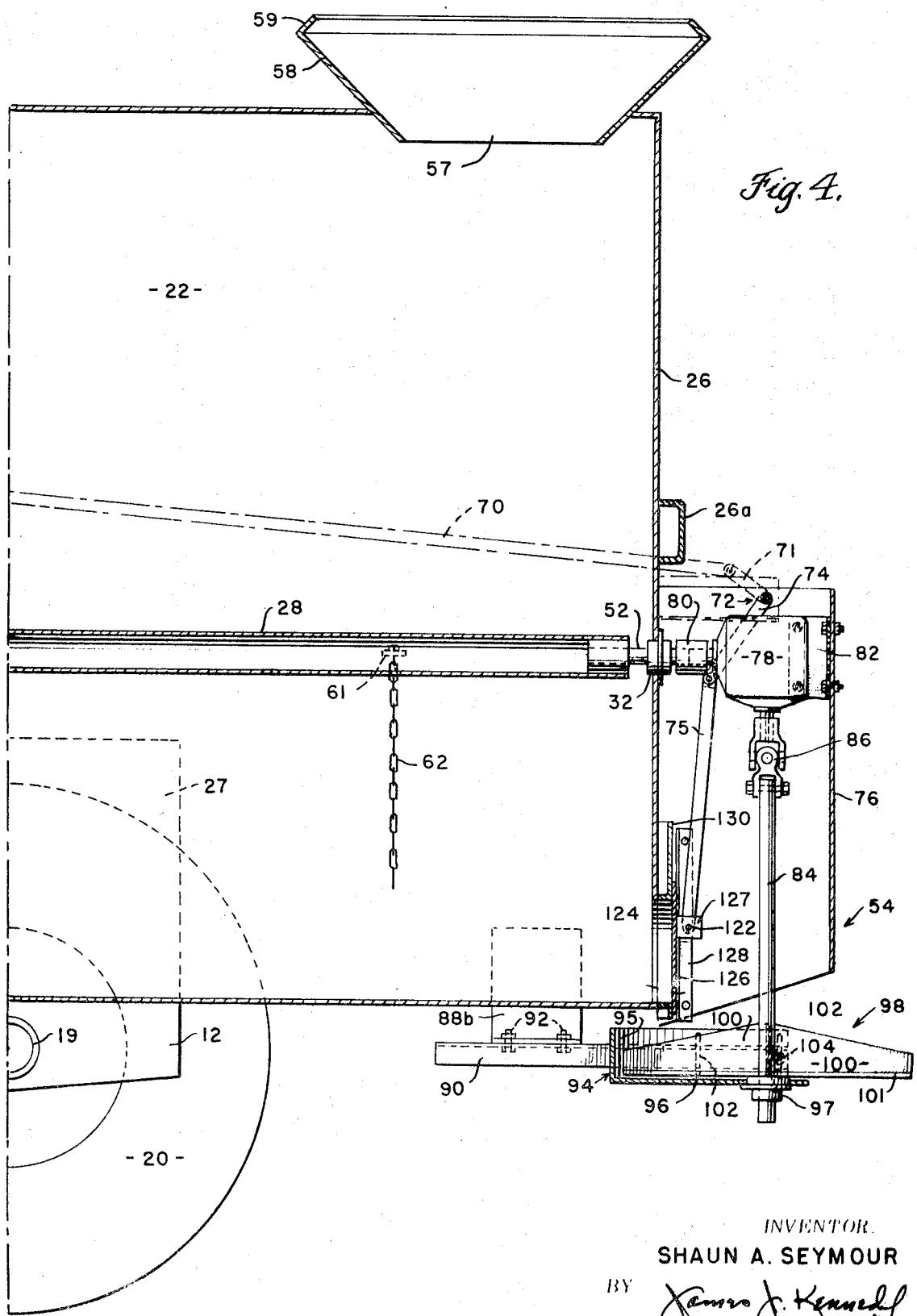

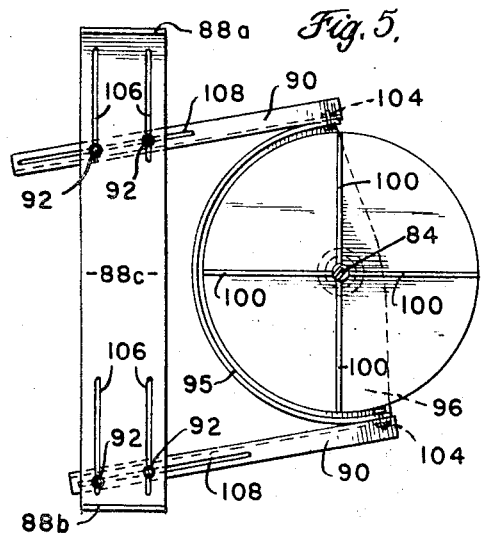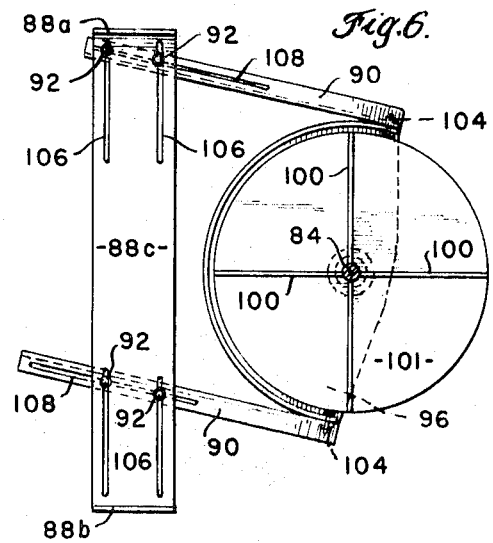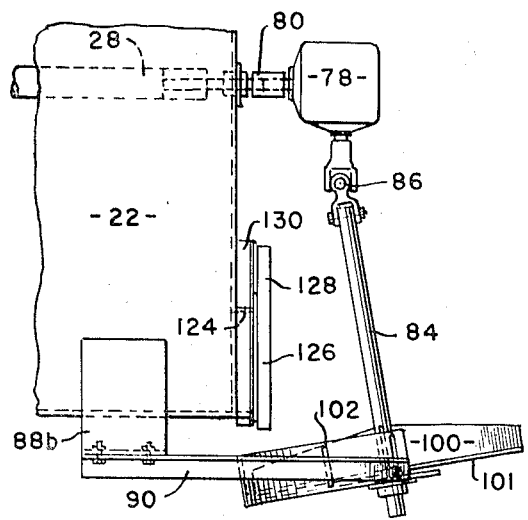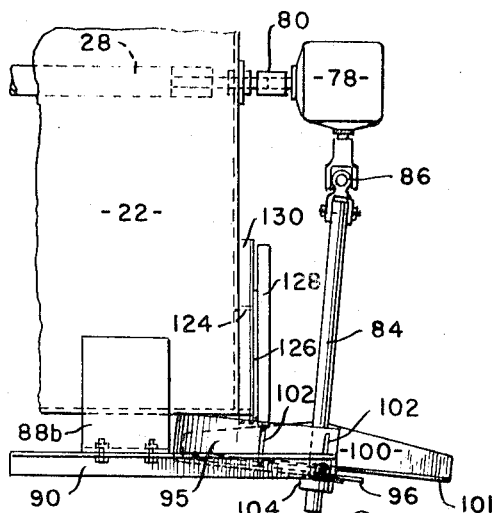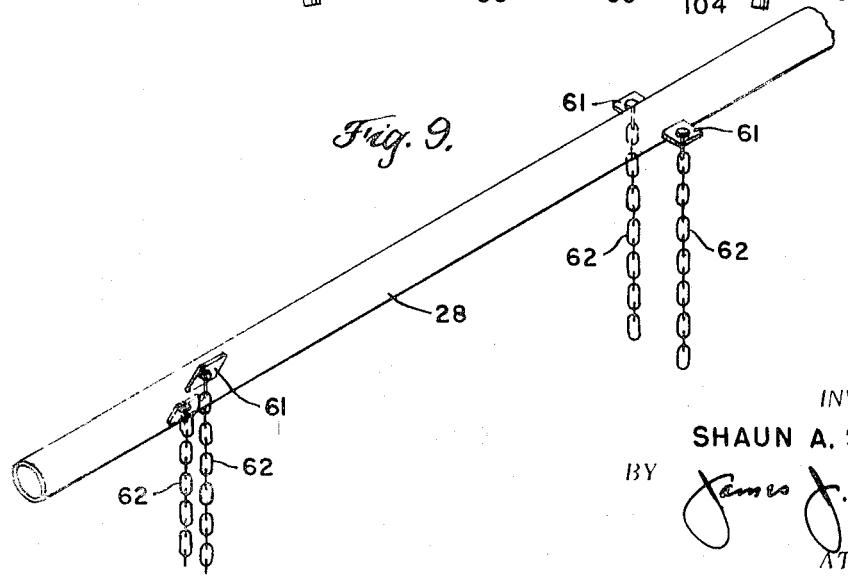

MATERIAL SPREADER

BACKGROUND OF THE INVENTION

One of the most time-consuming chores on the farm is the daily spreading of manure. Regardless of the soil or weather conditions, most farmers, with conventional solid manure-spreading equipment, must haul and spread manure every day.

The conventional spreaders include wagons which are equipped to discharge solid manure rearwardly using a movable wagon bed in cooperation with a plurality of rearwardly mounted beaters, or paddles which tend to fling the manure rearwardly from the spreader.

The modern trend in manure handling, however, has been to move away from the time-consuming solid manure-handling systems and methods and change to a liquid, or slurry-type manure which eliminates the need for the farmer to haul manure each and every day. Using a liquid manure-handling system, the farmer merely washes the manure into a suitable container, which is accessible from his barn, and stores liquified manure in the container until such time as he is ready to spread it. This type of system permits the farmer to delay his spreading chores for several weeks or even months since all he need do later is pump the material into a liquid-type spreader for discharge on his adjoining fields.

With the advent of the slurry manure handling systems new material spreaders had to be designed. Conventional spreaders, because of their design could not contain the liquid manure. As a result, a flail-type spreader was developed which can generally be described as an opended-top container having a central rotatable shaft with a plurality of flail discharge chains mounted therealong which tend to fling material laterally from one side of the container as the shaft was rotated.

In addition to the flail-type spreader, a tank-type spreader has been developed. This type of spreader generally employs a pump or vacuum discharge system which positively sucks material from the tank. While this type of spreader is more economical to run than the flail-type spreader because of the increased capacity, the discharge systems tend to increase the initial costs excessively. The pumps become clogged with solid manure particles and the discharge from the vacuum or pressurized tank, at times, is rendered ineffective because as the tank empties, the material sloshes in the container uncovering the discharge port causing a pressure loss in the tank so that only a dribble of material discharged from the spreader.

Generally speaking, none of the tank-type spreaders presently available are provided with any suitable means to vary the direction of the spreading pattern to conform to condition in terrain, etc. When the manure is being spread on hilly terrain it is very desirable to be able to direct the spread pattern to compensate for the attitude of the tank with respect to the ground. Under other conditions, high winds may also create problems in distributing the material on the place intended. It is also desirable to include some type of agitator means in the tank to keep the slurry thoroughly mixed up.

SUMMARY OF THE INVENTION

According, it is the primary object of this invention to provide a tank-type manure spreader having an adjustably positionable discharge means to vary the direction of the uniform spread pattern of the discharged material.

Another object of the invention is to provide a tank-type manure spreader with a flail-type agitator means in the tank which serves to keep the solid particles in the slurry in suspension during the discharge operation.

A further object of the invention is to provide a generally horizontal rotatable spinner discharge means, operably associated with an adjustable shroud means disposed behind the spinner, and a discharge port to provide for a uniform material spread pattern variably directable behind the spreader.

BRIEF DESCRIPTION OF THE DRAWINGS

FIG. 3 is an end section view taken as indicated by the line 3—3 in FIG. 1;

FIG. 4 is a fragmentary cross-sectional view taken on the line 4—4 of FIG. 3;

FIG. 5 is a plan view illustrating the shroud in one position of adjustment;

FIG. 6 is a plan view illustrating the shroud in another position of adjustment;

FIG. 7 is an elevational view illustrating one of the angular adjustment positions of the shroud and spinner;

FIG. 8 is an elevational view illustrating another one of the angular adjustment positions of the shroud and spinner; and FIG. 9 is an isometric view of the disposition of the agitator chains along the shaft.

DESCRIPTION OF THE PREFERRED EMBODIMENT

Figure 1:
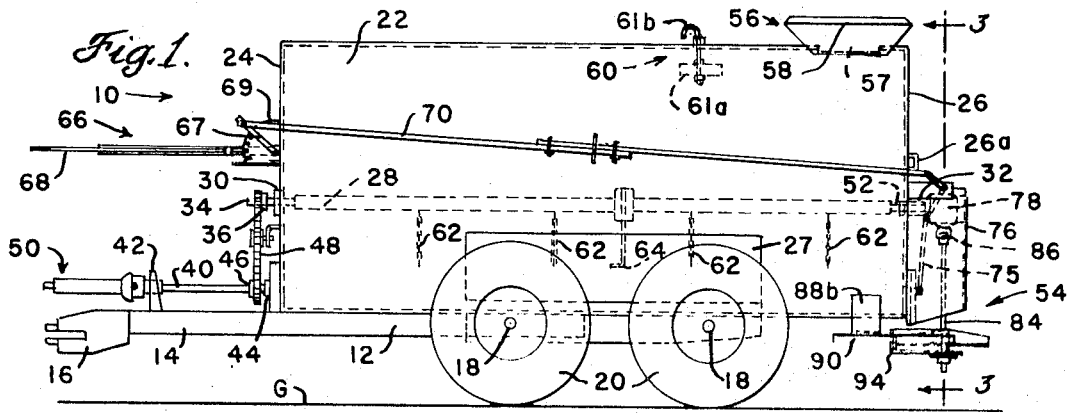
FIG. 1 is a side elevation of a liquid manure spreader constructed in accordance with the present invention.

Referring now generally to FIG. 1, a tank-type, liquid material spreader 10, of the type attachable to a tractor (not shown) having a power takeoff shaft and implement-connecting means associated therewith, includes a frame portion 12, extending in a fore-and-aft direction behind the tractor (not shown), a tongue portion 14 and a hitch 16, adapting the frame to be connected to the tractor implement-connecting means (not shown). A pair of parallel, spaced apart axles 18 are mounted rearwardly of frame 12 in support casing 19 (see FIG. 3). A wheel 20 is mounted at the end of each axle 18 to provide a wheeled support for the spreader frame so that it may travel over ground G. The wheels are so located with respect to spreader tank 22 as to insure that tongue portion 14 and hitch 16 are forced downwardly on the tractor drawbar (not shown), as the slurry material contained in the tank moves back and forth during transport. This permits greater stability of the tank. The wheels are also located far enough forward of the tank discharge means as not to interfere with the material spread pattern and this will help insure a uniform spread pattern.

The tank 22 is a cylindrical container provided with a forward end wall 24 and a rearward end wall 26, having a cross reinforcing channel 26a. The tank is mounted on the frame 12 by means of structural plate members 27 (see FIG. 3). Within the tank 22 there is provided a rotatable, axially extending shaft 28 which is journaled in end walls 24 and 26 at 30 and 32, respectively. To the forward end 34 of shaft 28 there is mounted a sprocket 36. A drive shaft 40, extending parallel to the tongue portion 14, is rotatably supported by stanchion 42 and journal 44. A sprocket 46 is mounted at the rearward end of shaft 40, in line with, but spaced apart from sprocket 36. A driving connection, formed by chain 48, extends between sprockets 36 and 46. The forward end of shaft 40 is provided with a power takeoff connection 50 which connects to the operating tractor (not shown). In this manner, a rotatable driving force is supplied to the shaft 28. The rearward end 57 of shaft 28 is connected to and operates the discharge means 54 in a manner to be more fully described in detail.

A hopper means 56 is mounted rearwardly on the upper portion of tank 22 by means 56a. The hopper means 56 is comprised of a inlet port 57 in tank 22, a hopper 58, having four sides converging downwardly toward side inlet port, and a lip 59 which extends about the upper edge of hopper 58 and is inclined upwardly and inwardly therefrom to provide an antisplash lip. This lip is particularly useful as the tank is being filled to prevent the slurry material from splashing down over the sides of the hopper and the tank.

Mounted forwardly of the hopper 58, also in the upper portion of tank 22, is a float means 60. The float means is adapted to provide a visual gauge of the depth of the material in the tank as the tank is filled to a point near capacity. Portion 61a floats in the slurry material and rises upwardly therewith as the tank is filled. As the float portion 61a rises, so does portion 61b which is connected integrally with portion 61a and extends upwardly out of the tank. It is the portion 61b which provides the visual gauge portion of the float means 60.

The tank is provided interior agitation means comprising a plurality of tabs 61, which are welded to the shaft 28 in spaced relation therealong, and a plurality of chain elements 62 which are fixed to the tabs 61, as shown in detail in FIG. 9. The tabs are mounted along the shaft in a spiralling relation and the associated chains hanging down into the tank when the shaft is stationary. When shaft 28 is rotated, however, the chains are caused to extend radially outwardly away from the shaft into the slurry material. This flail action of the chains tends to keep the solid particles of the slurry in suspension during transportation thereof. This insures that the maximum benefits of the manure spreading are not lost as the material is distributed since the slurry does not separate. The spiralling arrangement of the tabs along the shaft reduces the vibrations set up in the spreader as the tank is emptied. An in-line arrangement of the tabs and chains has been found to cause severe vibrational problems in the tank. To further diminish the forces set up in the tank due to the sloshing back and forth of material, a baffle 64 is inserted in the tank, extending from side to side thereof.

Disposed forwardly of tank 22 are control means 66 which include an operator's lever 68, a lever 67 connected to the inward end of lever 68 and actuated thereby, a plate 69 having a plurality of spaced notches in the outward edge thereof, an adjustable connecting link 70, connected to the other end of lever 67, and a lever 71 pivotally connected to link 70 at 71a. The lever 67 has a prawl (not shown) associated therewith which is selectively engageable with the notches on the plate 69. The lever 68 extends forwardly toward the connecting tractor (not shown) so that it is within easy reach of the operator. Rearwardly of tank end wall 26, the lever 71 is connected to a crank means 72 which is disposed on a cross shaft 73, supported at one end in shield 76 and adjacent the other end in a bracket 110 which extends rearwardly from wall 26. The crank means 72 is comprised of a sleeve portion 73a, surrounding shaft 73, and a pair of parallel outwardly and downwardly extending arms 74. The spaced-apart arms 74 are integral with sleeve 73a and rotate therewith in response to actuation of shaft 73 by the control lever 68. The free ends of the arms 74 are pivotally connected by means 120 to lever arms 75 which extend between the crank means 72 and tabs 126, extending outwardly from valve plate 126. The pivotal connecting means 122 connect the levers 75 to the tabs 126. The operation of these connections will be more fully described hereinafter.

The shield member 76, of rectangular cross section, is mounted on the rear wall 26 of the tank and extends outwardly therefrom. A gearbox 78 is mounted within the shield 76 at the upper end thereof, by means of a U-shaped bracket 82 which extends inwardly from the rear wall of the shield. The gearbox is then bolted, or otherwise, secured to the bracket 82. The input shaft of the gearbox extends forwardly and is joined to terminal end 52 of shaft 28 by a coupling 80. The gearbox output extends vertically downward to a universal joint 86. From the articulated joint 86, a generally vertically disposed, rotatable shaft 84 depends and terminates in journal 97.

Figure 2:
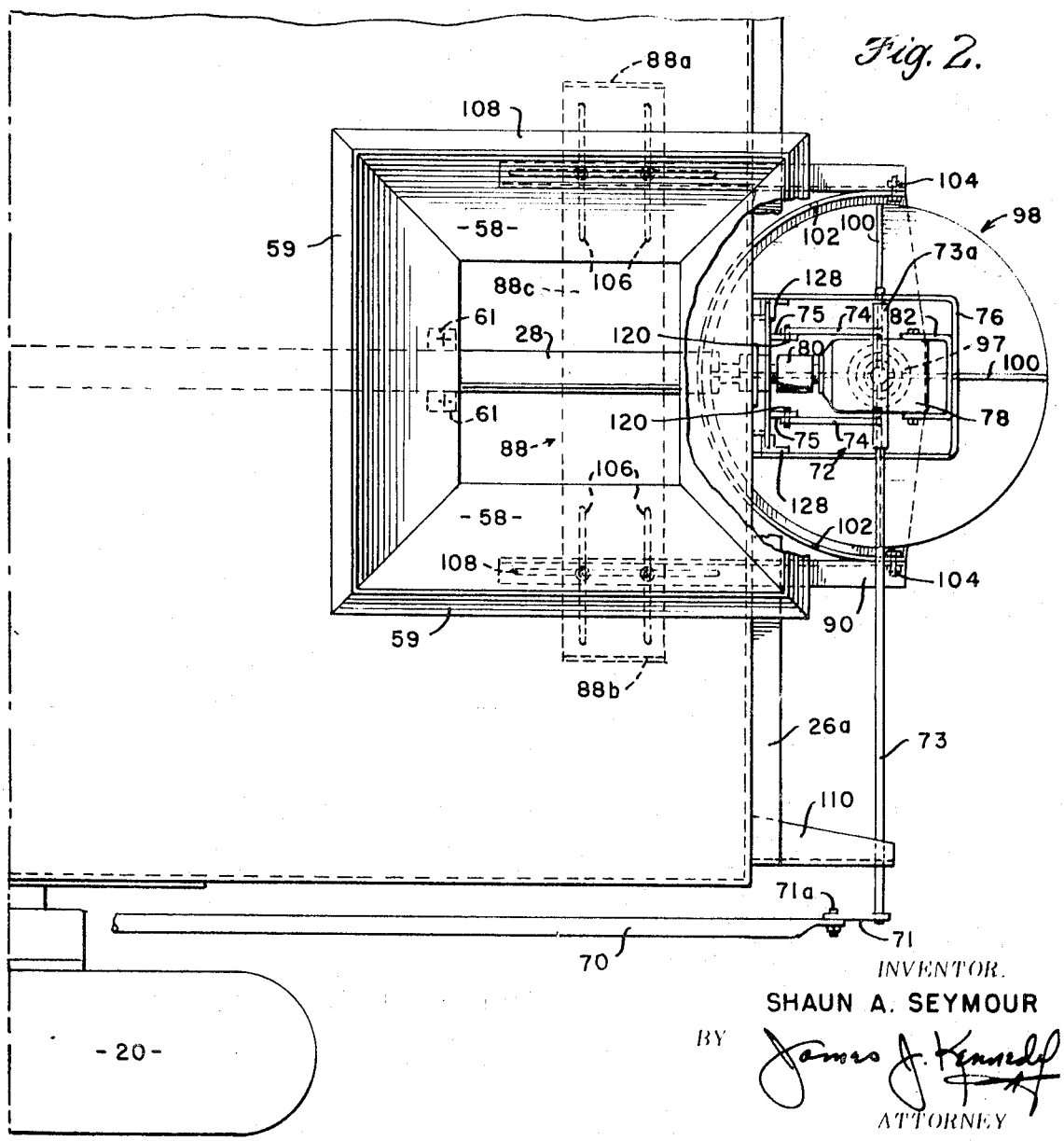
FIG. 2 is an enlarged plan view of the rear of the spreader, showing the inlet and the discharge means.

As illustrated in FIGS. 2, 3 and 4, a bracket 88, comprising upstanding vertical legs 88a and 88b and a connecting plate 88c, is fixed to the underside of tank 22. The legs 88a and 88b are fixed by the upper ends thereof to the tank by any suitable means (not shown). A pair of angle bar supports 90 are adjustably mounted by one end thereof, the forward end, to bracket 88 by means 92. A shroud means 94 is adjustably connected to the rearward ends of the bars 90 by fastening means 104.

The shroud means 94 is comprised of a semicircular, upstanding end wall 95, which opens outwardly, and a semicircular, generally horizontally disposed bottom wall 96, which is joined to wall 95 about the edge thereof, as shown in detail in FIG. 4. The bearing 97, which journals shaft 84, is mounted symmetrically with respect to the shroud means 94, adjacent the outer edge of wall 96 (see FIG. 2). Mounted in spaced relation above wall 96 on shaft 84 is a spinner 98. The spinner is comprised of a plurality of tapered paddles 100, fixed to shaft 84 and extending radially outwardly therefrom so that the distance between the paddles is equal, and a baseplate 101, fixed to the shaft 75 and paddles 100.

The adjustment means for the shroud and the support means is provided by cooperation of a plurality of slots. Shroud wall 95 is provided with a plurality of vertical slots 102 adjacent the outward ends thereof, as shown in FIGS. 2 and 4. The bracket 88 is provided with a plurality of slots 106 in plate 88c, as shown in FIG. 2. The slots 106 are arranged in parallel pairs adjacent each end of the bracket. The support arms 90 are also provided with an elongated slot 108, which extends from a point adjacent one end of the arms to a position intermediate the ends thereof. The arms 90 are adjustably attached to bracket 88 through the slots 108 and 106 by the mounting bolts 92. The shroud, in turn, is adjustably connected to the outward ends of arms 90 through the slots 102 by mounting bolts 104. This arrangement will be more fully described in detail hereinafter.

The discharge means 54 then, is comprised of the shield 76, the gearbox 78, the articulated vertical shaft 84, the spinner 98, the shroud 94, the valve plate 126, the control means 66, and, finally, an outlet port 124, disposed in lower portion of rear wall 26.

In operation, the tank 22 is filled from a storage container by a pump means (neither shown), through hopper 56 and inlet port 57. As the tank tends to the point of being completely filled, the float element 60 rises up to indicate this fact. Upon completion of the tank filling the slurry manure material is hauled in the tank to the desired discharge point during which the shaft 28 and its associated agitator chains are rotating within the tank to keep the solid particles of the slurry in suspension. At the discharge area, control means 66 is actuated so that through the series of connecting levers the valve plate 126 is caused to slide upwardly between guide means 128 and 130, disposed on either side of the discharge port 124, so that the discharge port is uncovered. The amount of opening desired at the port 124 may be set by engaging the prawl (not shown) of lever 67 in the notches of plate 69. Since the shaft 28 is rotating, the gearbox 78 has transmitted the rotary motion at right angles thereto to shaft 84, on which the spinner 98 is mounted. Material from the tank is passed through port 124 onto spinner 98, where in cooperation with shroud 94, the material is flung rearwardly from the tank in a relatively uniform pattern. The tapered paddles 100, because of their taper, help to provide a uniform spread pattern and help to keep the paddles relatively clean.

If a straight rearward spread pattern is desired, then the discharge means is adjusted to the position of the elements shown in FIGS. 1 through 4. However, if a straight rearwardly directed pattern is not desirable, then the direction of the spread pattern may be changed by loosening the bolts 92 and 104 on the shroud assembly.

Referring specifically to FIGS. 5 through 8, several adjusted positions are shown. In FIG. 5, for example, the arms 90 are angularly disposed with respect to bracket 88 through a cooperation of the slots 106–108 and bolts 92. In this adjusted mode, the shroud opening is directed to the right of the machine as one stands rearwardly of the device and looks in the direction of travel. Similarly FIG. 6 shows the shroud and spinner shifted to the left. In FIG. 7, the shroud and spinner are shown in an angled relation to the bracket 88. This is accomplished by moving the arms 90 to their furthest rearwardly extended position forcing the shaft 84 from its vertical position by pivoting it about the universal joint 86. FIG. 8 illustrates the shaft, spinner and shroud in its furthest forwardly adjusted position.

Further adjustment of the shroud and spinner may be made adjusting the position of arms 90 in any combination of the positions shown in FIGS. 5 through 8, so that the discharge means may be simultaneously adjusted vertically and horizontally. The pattern direction may be still further directed to the right or left of the tank if bolts 104 connecting the arms 90 to the shroud wall 95 are selectively moved to the other vertical slots 102 from the positions shown in FIGS. 5 through 8. In any mode of adjustment, the spread pattern coming from the spinner and shroud is generally uniform, and the slurry material will always fall from the port 124 onto the spinner ahead of the shroud wall 95.

While this invention has been described in connection with a particular embodiment thereof, it will be understood that it is capable of modification, and this application is intended to cover any variations, uses, or adaptations following, in general, the principles of the invention and including such departures from the present disclosure as come within the known or customary practice in the art to which the invention pertains, and as fall within the scope of the invention or the limits of the appended claims.

Having thus described my invention, what I claim is:

1. A material spreader attachable to a tractor having a power takeoff shaft and implement-connecting means, and implement including a wheeled implement frame extending in a fore-and-aft direction behind the tractor and transportable over the ground therebehind; a cylindrical slurry material container on said frame and having front and rear end walls; inlet means for filling said container and discharge means for distributing the slurry material over the ground, the improvement comprising; an adjustable shroud means disposed generally horizontally, behind said discharge means and having a generally semicircular bottom wall and a semicircular upstanding wall disposed about the circular edge of said bottom wall and adjustable mounting means on said container ad movable with respect thereto, said shroud being connected to said mounting means for movement therewith and varying the direction of the uniformly spread pattern of the slurry discharge.

2. A material spreader attachable to a tractor, having a power takeoff shaft and implement connecting means, for movement over the ground therewith comprising, in combination: a wheeled implement frame extending in a fore-and-aft direction behind the tractor; a cylindrical slurry material container, having front and rear end walls, mounted on said frame; a rotatable shaft journaled in said end walls and extending axially through said container; flail-type agitator means on said shaft having a plurality of mounting tabs spaced in spiral relation along said shaft and a plurality of chain elements respectively connected to said mounting tabs for rotation therewith to maintain a suspension of solid materials in said slurry; inlet means for filling said container; and discharge means at the rear end of said container for uniformly distributing slurry material on the ground, said discharge means including an outlet at the rear of said container, a shroud disposed generally horizontally below said outlet, and a spinner means cooperable with said shroud for slinging slurry material therefrom in a uniform pattern.

3. A material spreader attachable to a tractor having a power takeoff shaft and implement connecting means, for movement over the ground therewith comprising in combination: a wheeled implement frame extending in a fore-and-aft direction behind the tractor; a cylindrical slurry material container having forward and rearward end walls, mounted on said frame; a rotatable shaft journaled in said end walls and extending axially through said container; flail-type agitator means on said shaft for rotation therewith to maintain a suspension of solid materials in said slurry; inlet means mounted rearwardly on said container; and adjustable discharge means at the rear end of said container including a discharge port, a vertically slidable valve plate covering said port, a generally vertically disposed articulated driven shaft, a generally horizontally disposed rotatable spinner at the end of said shaft and adjacent said discharge port for rotatably distributing slurry material falling thereon from said discharge port on the ground behind said tank, and adjustably positionable shroud means adjustably mounted with respect to said tank and journaled on said vertical shaft whereby adjustment of the position of said shroud relative to the tank causes a corresponding repositioning of the vertical shaft and the spinner with respect to said tank.

4. A material spreader, as recited in claim 3, wherein said inlet means comprises a hopper means having an inwardly flared lip therearound and a floating fill gage disposed in said tank and extending outwardly thereof is provided for determining the amount of material in said container.

5. A material spreader, as recited in claim 3, wherein said spinner is provided with a plurality of paddles thereon in spaced-apart relation and extending radially outwardly from said vertical shaft, and said discharge means is simultaneously vertically and horizontally adjustably positionable with respect to said tank.

6. A material spreader attachable to a tractor having a power takeoff shaft and implement-connecting means, the implement including a wheeled implement frame extending in a fore-and-aft direction behind the tractor and transportable over the ground therebehind; a cylindrical slurry material container on said frame and having front and rear end walls; inlet means for filling said container and discharge means for distributing the slurry material over the ground, the improvement comprising: an adjustable shroud means disposed behind said discharge means for varying the direction of the uniformly spread pattern of the slurry discharge, said adjustable shroud means comprises a shroud having a generally semicircular bottom wall and a semicircular upstanding wall disposed about the circular edge of said bottom wall and adjustable mounting means on said tank and movable with respect thereto, said shroud being connected to said mounting means for movement therewith, said adjustable mounting means comprises a bracket disposed beneath said tank, said bracket having a pair of spaced apart upstanding arms connected by a plate portion having a plurality of elongated slots therein, and a pair of spaced-apart arms, extending rearwardly of said tank between said bracket and said shroud, said arms having an elongated slot adjacent one end thereof.

7. A material spreader, as recited in claim 6, wherein the slotted end portions of said arms cooperate with the slotted portions of said bracket through mounting means extending through the respective slotted portions for adjustably positioning the arms relative to the bracket, and the other ends of said arms extending to the ends of said semicircular upstanding wall, said wall ends having a plurality of vertical slots adjacent the outer ends thereof to receive mounting means for adjustably fixing said arms to said wall.

* * * * *